US007783495B2

(12) United States Patent
Seo et al.

(10) Patent No.: US 7,783,495 B2
(45) Date of Patent: Aug. 24, 2010

(54) METHOD AND APPARATUS FOR ENCODING AND DECODING MULTI-CHANNEL AUDIO SIGNAL USING VIRTUAL SOURCE LOCATION INFORMATION

(75) Inventors: Jeong Il Seo, Daejeon (KR); Han Gil Moon, Seoul (KR); Seung Kwon Beack, Daejeon (KR); Kyeong Ok Kang, Daejeon (KR); In Seon Jang, Chungcheongbuk-do (KR); Koeng Mo Sung, Seoul (KR); Min Soo Hahn, Daejeon (KR); Jin Woo Hong, Daejeon (KR)

(73) Assignees: Electronics and Telecommunications Research Institute, Daejeon (KR); Seoul National University Industry Foundation, Seoul (KR)

( * ) Notice: Subject to any disclaimer, the term of this patent is extended or adjusted under 35 U.S.C. 154(b) by 908 days.

(21) Appl. No.: 11/631,009

(22) PCT Filed: Jul. 8, 2005

(86) PCT No.: PCT/KR2005/002213

§ 371 (c)(1), (2), (4) Date: Dec. 28, 2006

(87) PCT Pub. No.: WO2006/006809

PCT Pub. Date: Jan. 19, 2006

(65) Prior Publication Data

US 2008/0167880 A1 Jul. 10, 2008

(30) Foreign Application Priority Data

Jul. 9, 2004 (KR) ...................... 10-2004-0053665
Oct. 12, 2004 (KR) ...................... 10-2004-0081303
Jul. 7, 2005 (KR) ...................... 10-2005-0061425

(51) Int. Cl.
*G01L 19/00* (2006.01)

(52) U.S. Cl. ...................... 704/500; 704/501; 704/502; 704/503; 704/504

(58) Field of Classification Search ................. 704/500, 704/501, 502, 503, 504
See application file for complete search history.

(56) References Cited

U.S. PATENT DOCUMENTS 5,946,352 A 8/1999 Rowlands et al.
(Continued)

FOREIGN PATENT DOCUMENTS

WO WO 99/52326 10/1999
(Continued)

OTHER PUBLICATIONS

Faller et al.; "Binaural Cue Coding Applied to Audio Compression with Flexible Rendering"; Audio Engineering Society, Convention Paper 5686; Oct. 2002; pp. 1-10.

(Continued)

*Primary Examiner*—Qi Han
(74) *Attorney, Agent, or Firm*—Lowe Hauptman Ham & Berner LLP

(57) ABSTRACT

Provided is a method and apparatus for encoding/decoding a multi-channel audio signal. The apparatus for encoding a multi-channel audio signal includes a frame converter for converting the multi-channel audio signal into a framed audio signal; means for downmixing the framed audio signal; means for encoding the downmixed audio signal; a source location information estimator for estimating source location information from the framed multi-channel audio signal; means for quantizing the estimated source location information; and means for multiplexing the encoded audio signal and the quantized source location information, to generate an encoded multi-channel audio signal.

31 Claims, 7 Drawing Sheets

U.S. PATENT DOCUMENTS

| | | | | |
|---|---|---|---|---|
| 6,128,597 | A | 10/2000 | Kolluru et al. | |
| 7,257,231 | B1 * | 8/2007 | Avendano et al. | 381/99 |
| 7,660,424 | B2 * | 2/2010 | Davis | 381/20 |
| 2003/0014243 | A1 | 1/2003 | Lapicque | |
| 2003/0026441 | A1 | 2/2003 | Faller | |
| 2003/0035553 | A1 | 2/2003 | Baumgarte et al. | |
| 2003/0223602 | A1 * | 12/2003 | Eichler et al. | 381/309 |
| 2003/0236583 | A1 | 12/2003 | Baumgarte et al. | |

FOREIGN PATENT DOCUMENTS

| | | |
|---|---|---|
| WO | WO 03/090208 | 10/2003 |
| WO | WO 2005/101905 | 10/2005 |

OTHER PUBLICATIONS

Baumgarte' et al.; "Design and Evaluation of Binaural Cue Coding Schemes"; Audio Engineering Society, Con vention Paper 5706; Oct. 2002; pp. 1-15.

International Office Action for EP 05774399.9, Jun. 21, 2007.

* cited by examiner

[Fig. 1]
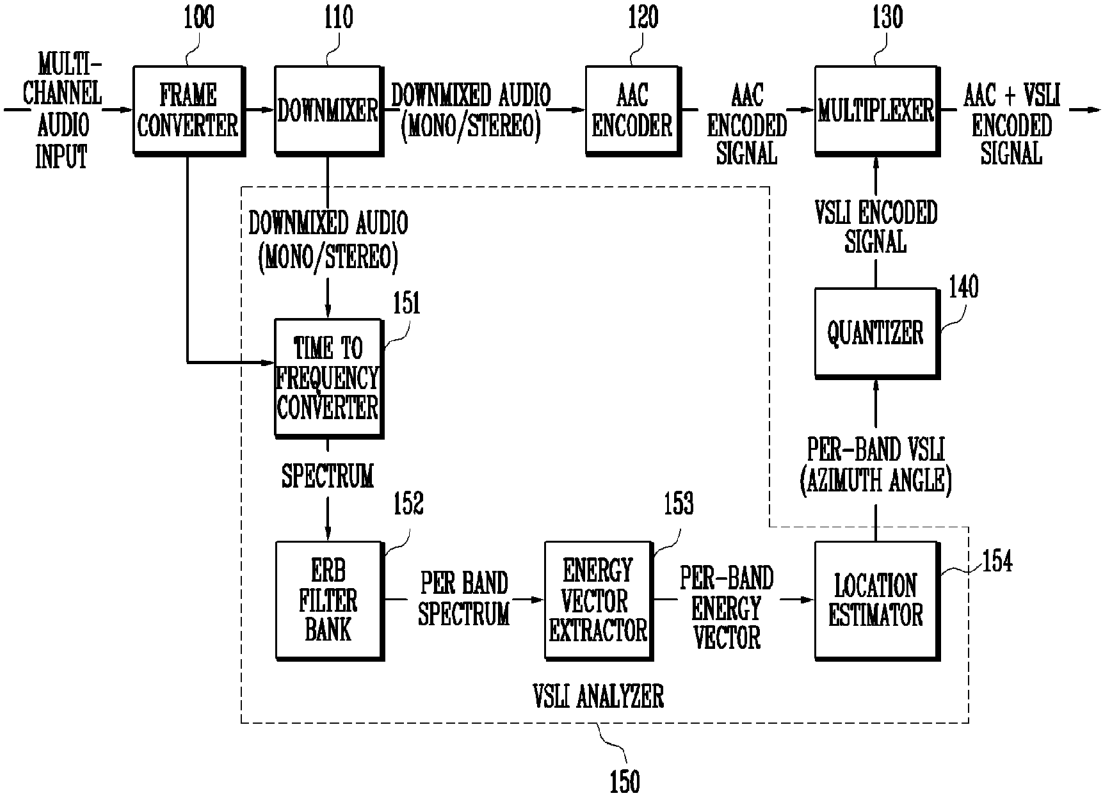
[Fig. 2]
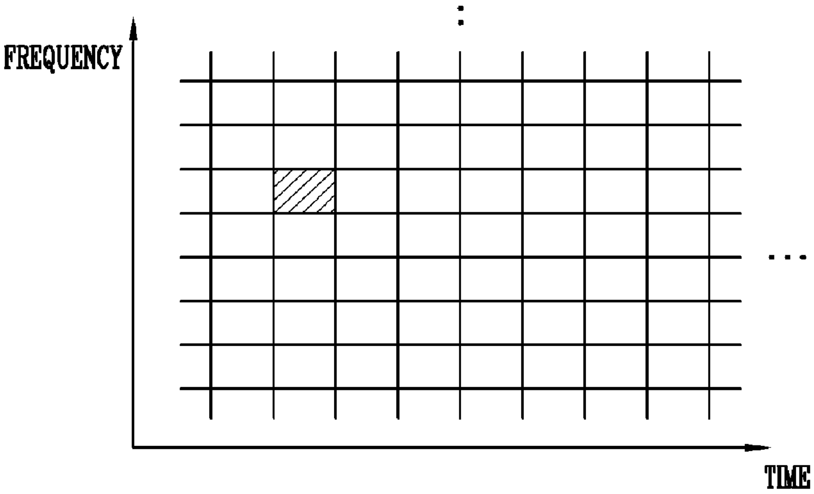

[Fig. 3]
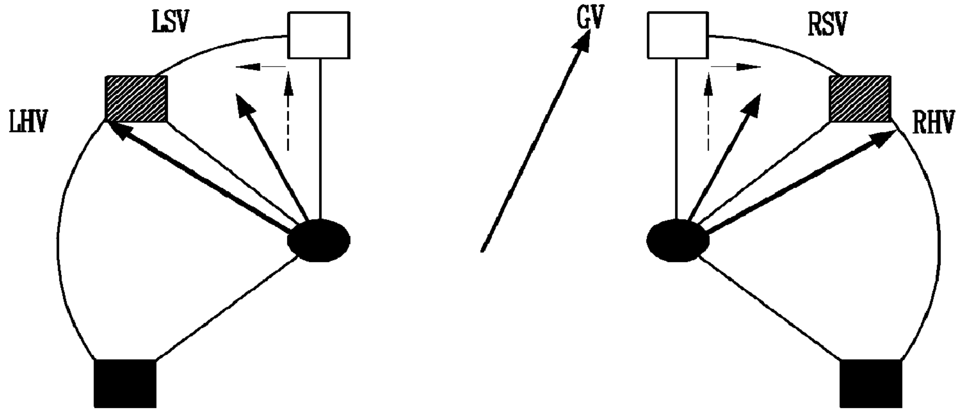
[Fig. 4]
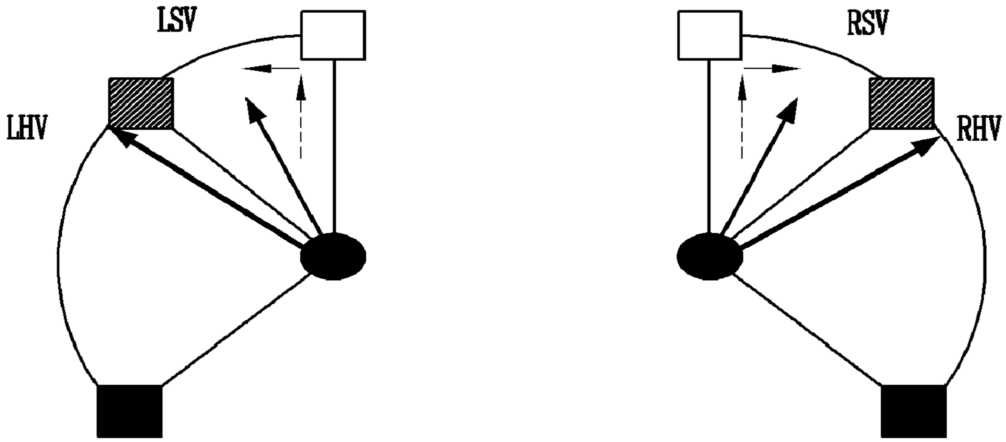

[Fig. 5]
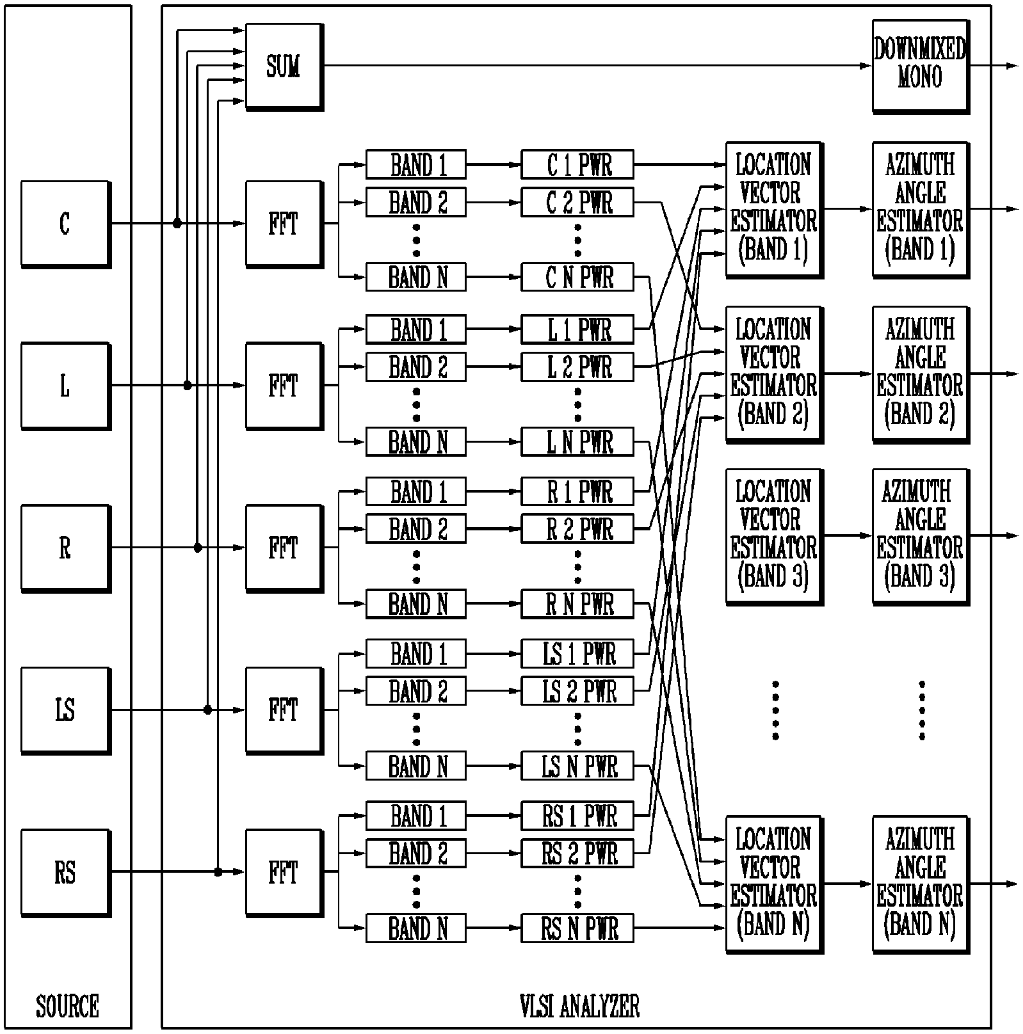
[Fig. 6]
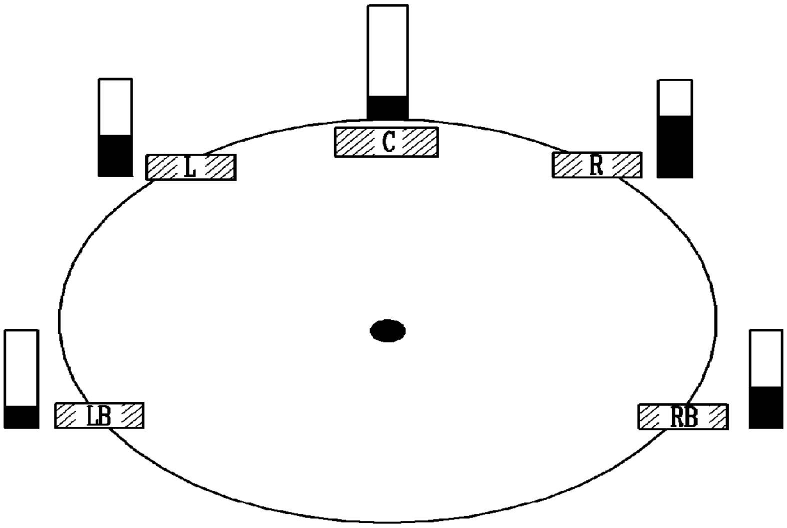

[Fig. 7]
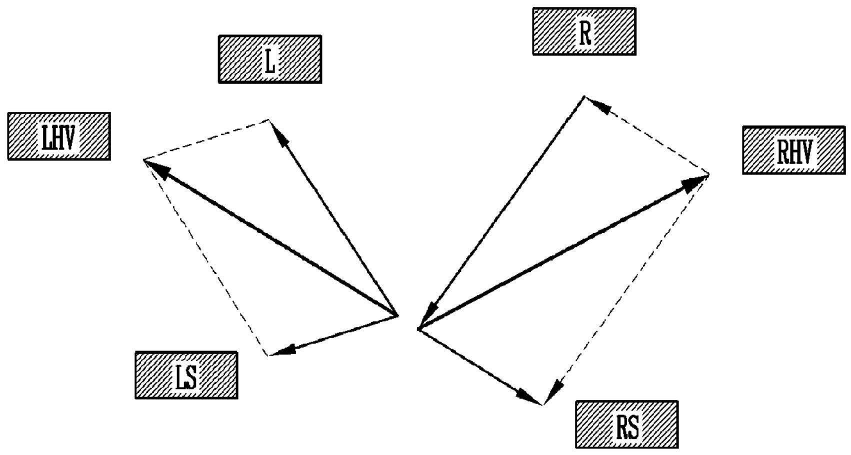
[Fig. 8]
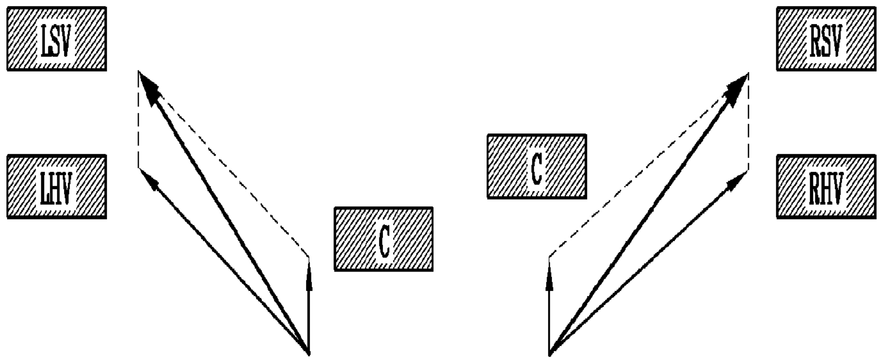
[Fig. 9]
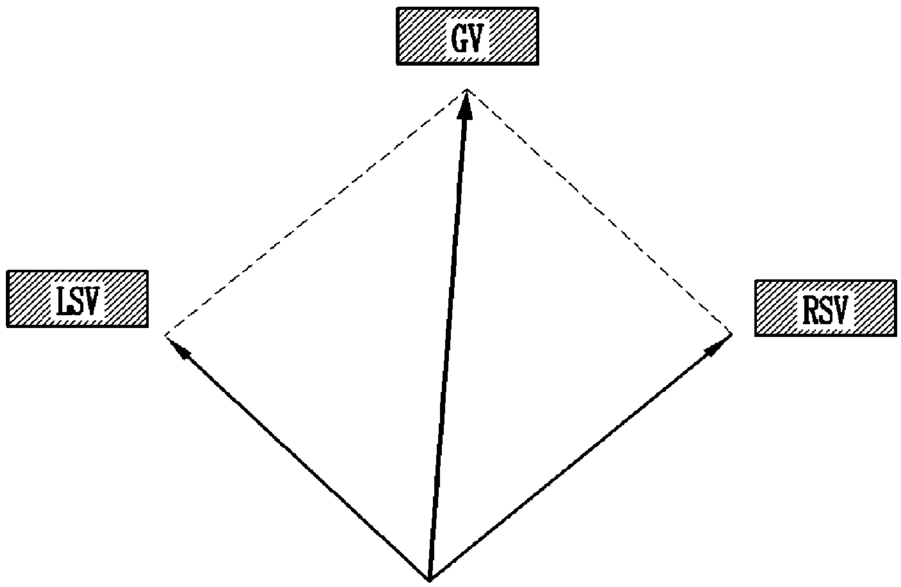

[Fig. 10]
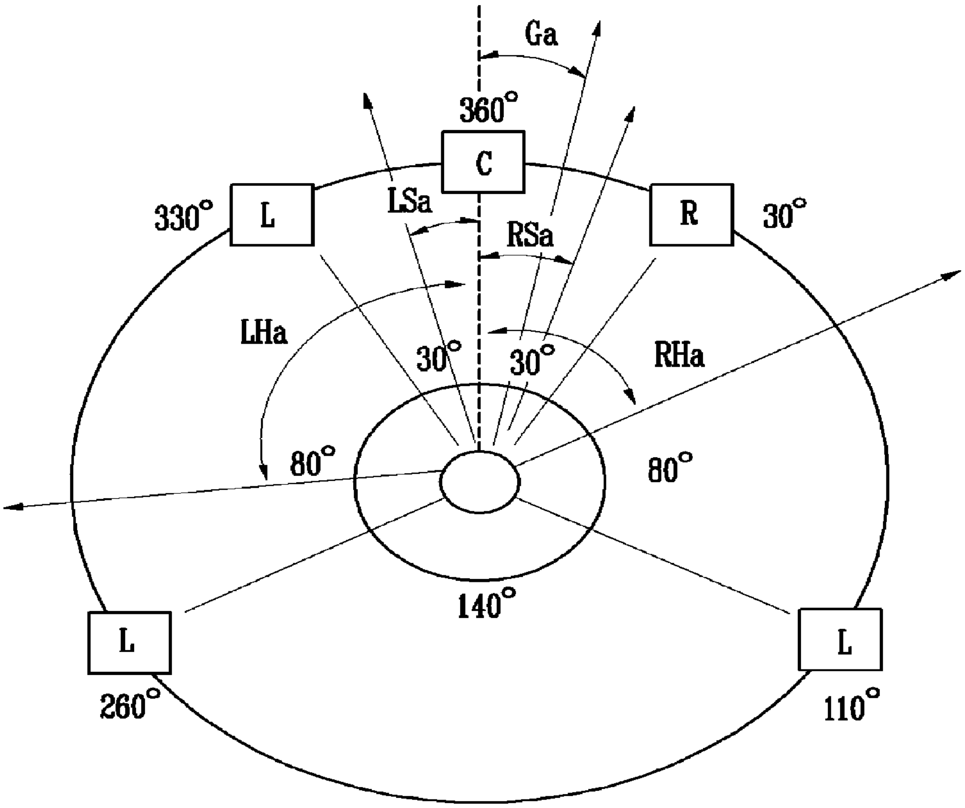

[Fig. 11]
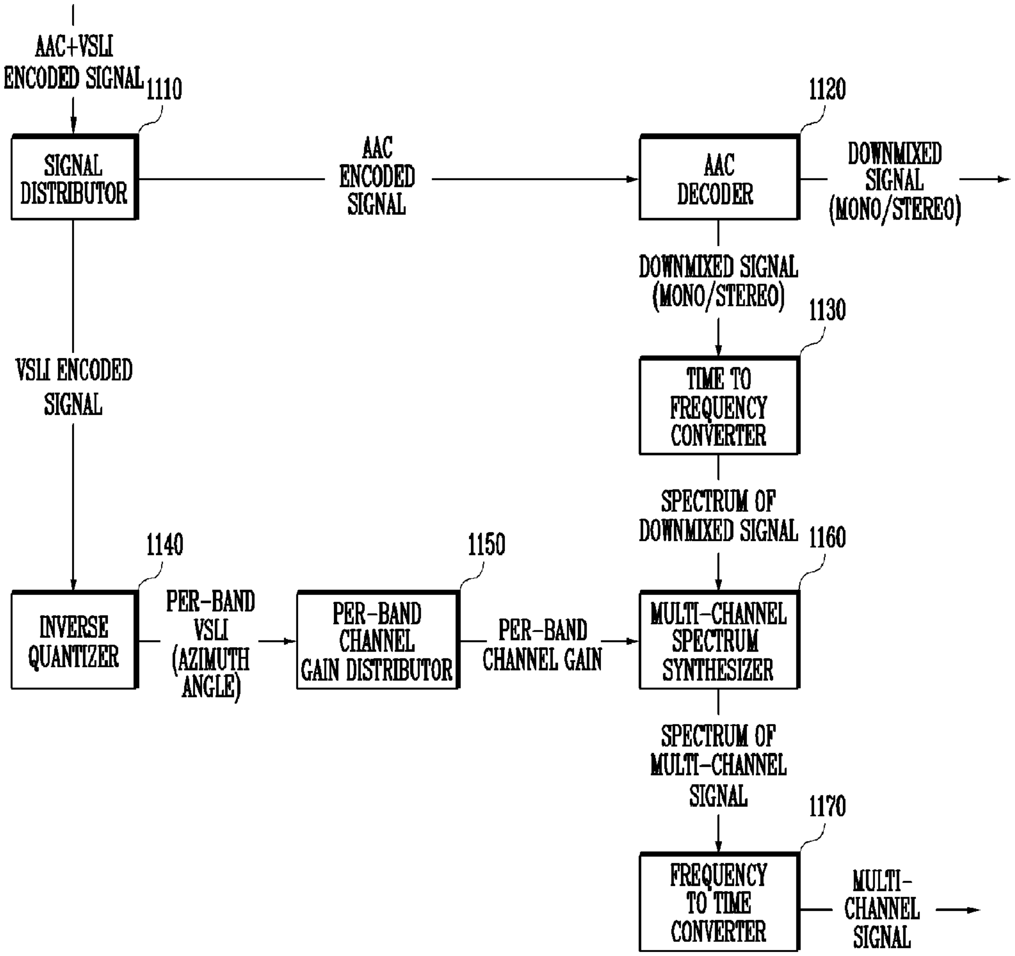

[Fig. 12]
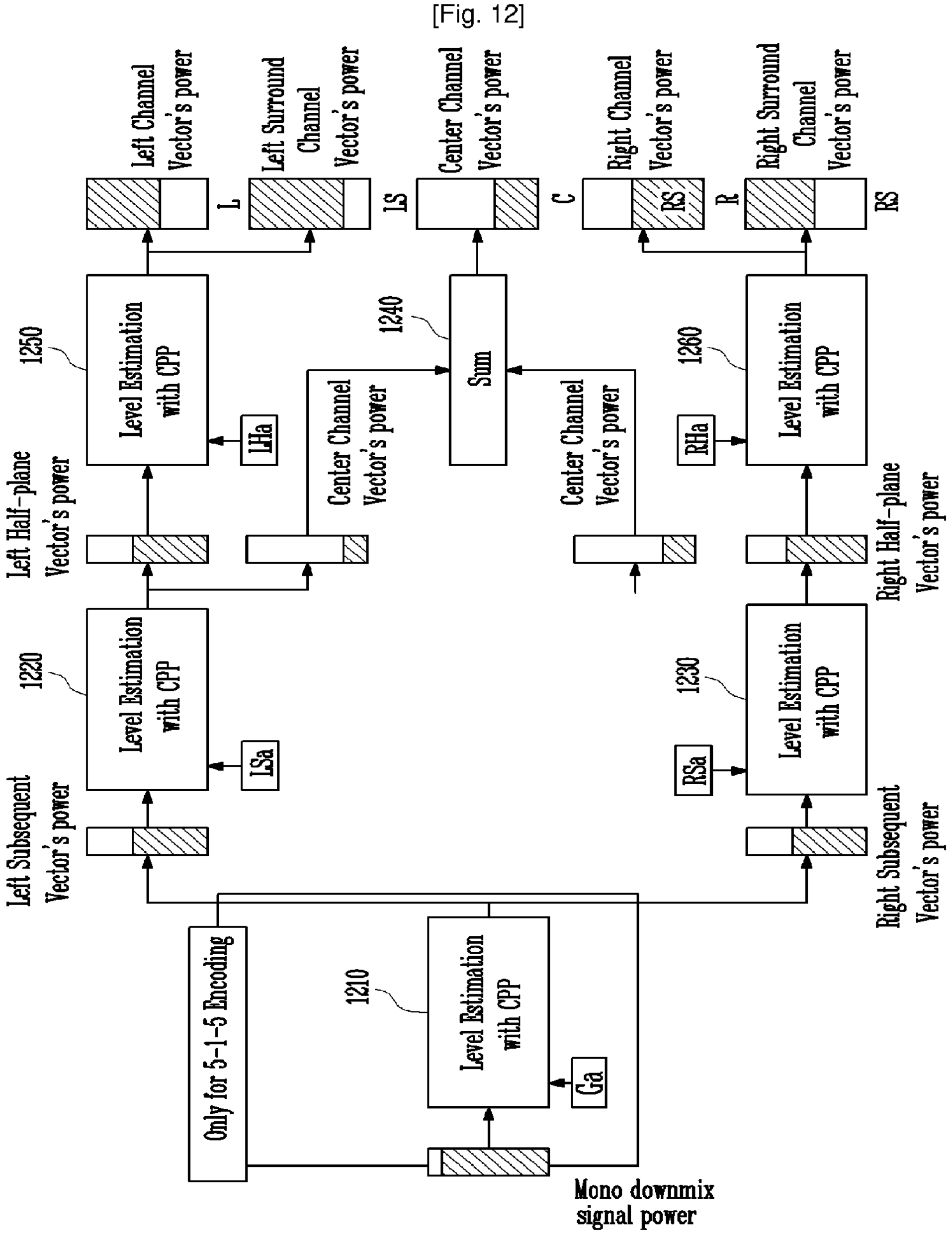

METHOD AND APPARATUS FOR ENCODING AND DECODING MULTI-CHANNEL AUDIO SIGNAL USING VIRTUAL SOURCE LOCATION INFORMATION

CROSS REFERENCE TO RELATED APPLICATION

This application is the National Phase application of International Application No. PCT/KR2005/002213, filed 8 Jul. 2005, which designates the United States and was published in English. This application, in its entirety, is incorporated herein by reference.

BACKGROUND ART

1. Field of the Invention

The present invention relates to a method and apparatus for encoding/decoding a multi-channel audio signal, and more particularly, to a method and apparatus for effectively encoding/decoding a multi-channel audio signal using Virtual Sound Location Information (VLSI).

2. Description of Related Art

Throughout the later half of the 1990s, Moving Picture Experts Group (MPEG) has performed research on compressing a multi-channel audio signal. Owing to the remarkable increase in multi-channel contents, increased demand for multi-channel contents, and increased need for a multi-channel audio services in a broadcasting communications environment, research on the multi-channel audio compression technology has been stepped up.

As a result, multi-channel audio compression technology such as MPEG-2 Backward Compatibility (BC), MPEG-2 Advanced Audio Coding (AAC), and MPEG-4 AAC, has been standardized in the MPEG. Also, multi-channel audio compression technology, such as AC-3 and Digital Theater System (DTS), has been commercialized.

In recent years, innovative multi-channel audio signal compression method such as typical Binaural Cue Coding (BCC) has been actively researched (C. Faller, 2002 & 2003; F. Baumgarte, 2001 & 2002). The goal of such research is the transfer of more realistic audio data.

BCC is technology for effectively compressing a multi-channel audio signal that has been developed on a basis of the fact that people can acoustically perceive space due to a binaural effect. BCC is based on the fact that a pair of ears perceives a location of a specific sound source using interaural level differences and/or interaural time differences.

Accordingly, in BCC, a multi-channel audio signal is downmixed to a monophonic or stereophonic signal and channel information is represented by binaural cue parameters such as Inter-channel Level Difference (ICLD) and Inter-channel Time Difference (ICTD).

However, there is a drawback in that a large number of bits are required to quantize the channel information such as ICLD and ICTD, and consequently, a wide bandwidth is required in transmitting the channel information.

SUMMARY OF THE INVENTION

The present invention is directed to reproduction of a realistic audio signal by encoding/decoding a multi-channel audio signal using only a downmixed audio signal and a small amount of additional information.

The present invention is also directed to maximizing transmission efficiency by analyzing a per-channel sound source of a multi-channel audio signal, extracting a small amount of virtual source location information, and transmitting the extracted virtual source location information together with a downmixed audio signal.

One aspect of the present invention provides an apparatus for encoding a multi-channel audio signal, the apparatus including: a frame converter for converting the multi-channel audio signal into a framed audio signal; means for downmixing the framed audio signal; means for encoding the downmixed audio signal; a source location information estimator for estimating source location information from the framed audio signal; means for quantizing the estimated source location information; and means for multiplexing the encoded audio signal and the quantized source location information, to generate an encoded multi-channel audio signal. The source location information estimator includes a time-to-frequency converter for converting the framed audio signal into a spectrum; a separator for separating per-band spectrums; an energy vector detector for detecting per-channel energy vectors from the corresponding per-band spectrum; and a VSLI estimator for estimating virtual source location information (VSLI) using the detected per-channel energy vector detected by the energy vector detector.

Another aspect of the present invention provides an apparatus for decoding a multi-channel audio signal, the apparatus including: means for receiving the multi-channel audio signal; a signal distributor for separating the received multi-channel audio signal into an encoded downmixed audio signal and a quantized virtual source location vector signal; means for decoding the encoded downmixed audio signal; means for converting the decoded downmixed audio signal into a frequency axis signal; a VSLI extractor for extracting per-band VSLI from the quantized virtual source location vector signal; a channel gain calculator for calculating per-band channel gains using the extracted per-band VSLI; means for synthesizing a multi-channel audio signal spectrum using the converted frequency axis signal and the calculated per-band channel gains; and means for generating a multi-channel audio signal from the synthesized multi-channel spectrum.

Yet another aspect of the present invention provides a method of encoding a multi-channel audio signal, including the steps of: converting the multi-channel audio signal into a framed audio signal; downmixing the framed audio signal; encoding the downmixed audio signal; estimating source location information from the framed audio signal; quantizing the estimated source location information; and multiplexing the encoded downmixed audio signal and the quantized source location information, to generate an encoded multi-channel audio signal.

Still another aspect of the present invention provides a method of decoding a multi-channel audio signal, including the steps of: receiving the multi-channel audio signal; separating the received multi-channel audio signal into an encoded downmixed audio signal and a quantized virtual source location vector signal; decoding the encoded downmixed audio signal; converting the decoded downmixed audio signal into a frequency axis signal; analyzing the quantized virtual source location vector signal and extracting per-band VSLI therefrom; calculating per-band channel gains from the extracted per-band VSLI; synthesizing a multi-channel audio signal spectrum using the converted frequency axis signal and the calculated per-band channel gains; and producing a multi-channel audio signal from the synthesized multi-channel spectrum.

BRIEF DESCRIPTION OF THE DRAWINGS

The above and other features and advantages of the present invention will become more apparent to those of ordinary skill in the art by describing in detail exemplary embodiments of the invention with reference to the attached drawings in which:

FIG. 1 is a block diagram of an apparatus for encoding a multi-channel audio signal according to an exemplary embodiment of the present invention;

FIG. 2 is a conceptual diagram of a time-to-frequency lattice using an Equivalent Rectangular Bandwidth (ERB) filter bank;

FIG. 3 is a conceptual diagram of source location vectors estimated according to the preset invention, in the case where a downmixed multi-channel audio signal is monophonic;

FIG. 4 is a conceptual diagram of source location vectors estimated according to the preset invention, in the case where a downmixed multi-channel audio signal is stereophonic;

FIG. 5 is a conceptual diagram illustrating a process of estimating virtual source location information according to an exemplary embodiment of the present invention;

FIG. 6 shows an example of per-channel energy vectors when 5.1 channel speakers are used;

FIG. 7 is a conceptual diagram illustrating a process of estimating a Left Half-plane Vector (LHV) and a Right Half-plane Vector (RHV) according to the present invention;

FIG. 8 is a conceptual diagram illustrating a process of estimating a Left Subsequent Vector (LSV) and a Right Subsequent Vector (RSV) according to the present invention;

FIG. 9 is a conceptual diagram illustrating a process of estimating a Global Vector (GV) according to the present invention;

FIG. 10 illustrates azimuth angles, each of which represents the corresponding virtual source location information according to the present invention;

FIG. 11 is a block diagram of an apparatus for decoding an encoded multi-channel audio signal according to an exemplary embodiment of the present invention; and FIG. 12 is a block diagram illustrating a process of calculating per-channel gains of a downmixed audio signal using Virtual Source Location Information (VSLI) according to an exemplary embodiment of the present invention.

DETAILED DESCRIPTION OF THE PREFERRED EMBODIMENTS

The present invention will now be described more fully with reference to the accompanying drawings, in which exemplary embodiments of the invention are shown. This invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art.

FIG. 1 is a block diagram of an apparatus for encoding a multi-channel audio signal according to an exemplary embodiment of the present invention. As shown in FIG. 1, the multi-channel audio signal encoding apparatus includes a frame converter 100, a downmixer 110, an Advanced Audio Coding (AAC) encoder 120, a multiplexer 130, a quantizer 140, and a Virtual Source Location Information (VSLI) analyzer 150.

The frame converter 100 frames the multi-channel audio signal, using a window function such as a sine window, to process the multi-channel audio signal in each block. The downmixer 110 receives the framed multi-channel audio signal from the frame converter 100 and downmixes it into a monophonic signal or a stereophonic signal. The AAC encoder 120 compresses the downmixed audio signal received from the downmixer 110, to generate an AAC encoded signal. It then transmits the AAC encoded signal to the multiplexer 130.

The VSLI analyzer 150 extracts Virtual Source Location Information (VSLI) from the framed audio signal. Specifically, the VSLI analyzer 150 may include a time-to-frequency converter 151, an Equivalent Rectangular Bandwidth (ERB) filter bank 152, an energy vector detector 153, and a location estimator 154.

The time-to-frequency converter 151 performs a plurality of Fast Fourier Transforms (FFTs) to convert the framed audio signal into a frequency domain signal. The ERB filter bank 152 divides the converted frequency domain signal (spectrum) into per-band spectrums (for example, 20 bands). FIG. 2 is a conceptual diagram of a time-to-frequency lattice using the ERB filter bank 152.

The energy vector extractor 153 estimates per-channel energy vectors from the corresponding per-band spectrum.

The location estimator 154 estimates virtual source location information (VSLI) using the per-channel energy vectors estimated by the energy vector extractor 153. In one exemplary embodiment, the VSLI may be represented using azimuth angles between the source location vectors and a center channel. As described later, the VSLI estimated by the location estimator 154 can vary depending on whether the downmixed audio signal is monophonic or stereophonic.

FIG. 3 is a conceptual diagram illustrating the source location vectors estimated according to the present invention, in the case where the downmixed audio signal is monophonic. As shown in FIG. 3, the source location vectors estimated from the downmixed monophonic signal include a Left Half-plane Vector (LHV), a Right Half-plane Vector (RHV), a Left Subsequent Vector (LSV), a Right Subsequent Vector (RSV), and a Global Vector (GV). In the case where the downmixed multi-channel audio signal is monophonic, since it is not known whether channel gain is higher on the left or on the right, the GV is required.

FIG. 4 is a conceptual diagram illustrating the source location vectors estimated according to the present invention, in the case where the downmixed multi-channel audio signal is stereophonic. As shown in FIG. 4, the source location vectors estimated from the downmixed monophonic signal include the LHV, the RHV, the LSV, and the RSV, but not the GV.

Referring again to FIG. 1, the quantizer 140 quantizes the VSLI (azimuth angles) received from the VSLI analyzer 150 and transmits the quantized VSLI signal to the multiplexer 130. The multiplexer 130 receives the AAC encoded signal from the AAC encoder 120 and the quantized VSLI signal from the quantizer 140 and multiplexes them to generate an encoded multi-channel audio signal (i.e., the AAC encoded signal+the VSLI signal).

FIG. 5 is a conceptual diagram illustrating a process of estimating the VSLI according to an exemplary embodiment of the present invention. As shown in FIG. 5, in the case where the input multi-channel audio signal is comprised of five channels including center (C), front left (L), front right (R), left subsequent (LS), and right subsequent (RS), the input signal is converted into the frequency axis signal through the plurality of FFTs and divided into N number of frequency bands (BAND 1, BAND 2, . . . , and BAND N) in the ERB filter bank 152.

Next, the per-channel energy vectors may be detected from the power of each of the five channels for each band (for example, C1 PWR, L1 PWR, R1 PWR, LS1 PWR, and RS1 PWR). Using Constant Power Panning (CPP) in which the magnitudes of signals of neighboring channels are adjusted for sound localization, the source location vectors may be estimated from the detected per-channel energy vectors and the azimuth angles between the source location vectors and the center channel, which represent VSLI, may be estimated.

FIG. 6 to 9 illustrate detailed processes of estimating the VSLI according to the present invention. In detail, as shown in FIG. 6, it is assumed that the per-channel energy vectors estimated using the energy vector estimator are a center channel energy vector (C), a front left channel energy vector (L), a left subsequent channel energy vector (LS), a front right channel energy vector (R), and a right subsequent channel energy vector (RS). The LHV is estimated using the front left channel energy vector (L) and the left subsequent channel energy vector (LS), and the RHV is estimated using the front right channel energy vector (R) and the right subsequent channel energy vector (RS) (Refer to FIG. 7).

The LSV and RSV may be estimated using the LHV, the RHV, and the center channel energy vector (C) (Refer to FIG. 8).

In the case where the downmixed audio signal is stereophonic, the gain of each channel can be calculated using only the LHV, RHV, LSV, and RSV. However, in the case where the downmixed audio signal is the monophonic signal, it is not known whether the channel gain is higher on the left or on the right, and therefore the GV is required. The GV can be calculated using the LSV and RSV (Refer to FIG. 9). The magnitude of the GV is set to the magnitude of the downmixed audio signal.

The source location vectors extracted using the above method may be expressed using the azimuth angles between themselves and the center channel. FIG. 10 illustrates the azimuth angles of the source location vectors extracted by the processes shown in FIGS. 6 to 9. As shown, the VSLI may be expressed using five azimuth angles, which include a Left Half-plane vector angle (LHa), a Right Half-plane vector angle (RHa), a Left Subsequent vector angle (LSa), and a Right Subsequent vector angle (RSa), and further include a Global vector angle (Ga) in the case where the downmixed audio signal is monophonic. Since each value has a limited dynamic range, quantization can be performed using fewer bits than Inter-Channel Level Difference (ICLD).

To quantize the VSLI information, a linear quantization method in which quantization is performed in uniform intervals or a nonlinear quantization method in which quantization is performed in non-uniform intervals may be used.

In one exemplary embodiment, the linear quantization method is based on Equation 1 below:

$$I_{i,b} = \left[\frac{\Delta\theta_{i,b}(Q-1)}{2\Delta\theta_{i,\max}} + \frac{1}{2}\right] + \frac{Q-1}{2}, \quad i = 1, K, 5 \qquad \text{[Equation 1]}$$

, wherein "θ" represents the magnitude of an angle to be quantized and the corresponding quantization index can be obtained from quantization level Q. "i" represents angle index (Ga:i=1, RHa:i=2, LHa:i=3, LSa:i=4, RSa:i=5) and "b" represents sub-band index. "$\Delta\theta_{i,max}$ represents the maximal variance level of each angle. For example, $\Delta\theta_{1,max}$ equals 180° $\Delta\theta_{2,max}$ and $\Delta\theta_{3,max}$ equal 15° and $\Delta\theta_{4,max}$ and $\Delta\theta_{5,max}$ equal 55°. As mentioned above, a maximal variance interval of each angle magnitude is limited, and therefore more effective and higher resolution quantization can be provided.

In general, statistical information on generation frequency with respect to the RHa, LHa, LSa, and RSa is inconclusive. However, the Ga has a generation frequency with a roughly symmetrical distribution centered on a center speaker. In other words, since the Ga varies evenly about the center speaker, it can be assumed that the generation distribution has an average expectation value of 0°. Accordingly, for the Ga, a more effective quantization level can be obtained when quantization is performed using the nonlinear quantization method.

Typically, the nonlinear quantization method is performed in a general m-law scheme, and m value can be determined depending on a resolution of the quantization level. For example, when the resolution is low, a relatively large m value may be used ($15<\mu\leqq 255$), and when the resolution is high, a smaller m value ($0\leqq\mu\leqq 5$) may be used to perform the nonlinear quantization.

FIG. 11 is a block diagram illustrating an apparatus for decoding an encoded multi-channel audio signal according to an exemplary embodiment of the present invention. As shown, the multi-channel audio signal decoding apparatus includes a signal distributor 1110, an AAC decoder 1120, a time-to-frequency converter 1130, an inverse quantizer 1140, a per-band channel gain distributor 1150, a multi-channel spectrum synthesizer 1160, and a frequency-to-time converter 1170.

The signal distributor 1110 separates the encoded multichannel audio signal back into the AAC encoded signal and the VLSI encoded signal, respectively. The AAC decoder 1120 converts the AAC encoded signal back into the downmixed audio signal (monophonic or stereophonic signal). The converted downmixed audio signal can be used to produce monophonic or stereophonic sound. The time-to-frequency converter 1130 converts the downmixed audio signal into a frequency axis signal and transmits it to the multi-channel spectrum synthesizer 1160.

The inverse quantizer 1140 receives the separated VSLI encoded signal from the signal distributor 1110 and produces per-band source location vector information from the received VSLI encoded signal. In the encoding process, as described above, the VSLI includes azimuth angle information (for example, LHa, RHa, LSa, RSa, and Ga in the case where the downmixed audio signal is monophonic), each of which represents the corresponding per-band source location vector. The source location vector is produced from the VSLI.

The per-band channel gain distributor 1150 calculates the gain per channel using the per-band VSLI signal converted by the inverse quantizer 1140, and transmits the calculated gain to the multi-channel spectrum synthesizer 1160.

The multi-channel spectrum synthesizer 1160 receives a spectrum of the downmixed audio signal from the time-to-frequency converter 1130, separates the received spectrum into per-band spectrums using the ERB filter bank, and restores the spectrum of the multi-channel signal using per-band channel gains output from the per-band channel gain distributor 1150. The frequency-to-time converter 1170 (for example, IFFF) converts the spectrum of the restored multichannel signal into a time axis signal to generate the multichannel audio signal.

FIG. 12 is a block diagram illustrating a process of calculating the per-channel gain of the downmixed audio signal using the VSLI according to an exemplary embodiment of the present invention. Here, the case in which the downmixed audio signal is monophonic is illustrated. In the case where the downmixed audio signal is stereophonic, block 1210 is omitted.

In block 1210, magnitudes of the LSV and the RSV are calculated using the magnitude of the downmixed monophonic signal, which is the magnitude of the GV, and the angle (Ga) of the GV. Next, magnitudes of the LHV and the first gain of the center channel (C) are calculated using the magnitude and angle (LSa) of the LSV (Block 1220). The gain of the center channel (C) is obtained by summing the first gain and the second gain calculated in the above process (block 1240).

Last, gains of the front left channel (L) and the left subsequent channel (LS) are calculated using the magnitude of the LHV and the corresponding angle (LHa) (block 1250), and gains of the front right channel (R) and the right subsequent channel (RS) are calculated using the magnitude of the RHV and the corresponding angle (RHa) (block 1260). According to the above processes, the gains of all channels can be calculated.

According to the present invention, a multi-channel audio signal can be more effectively encoded/decoded using virtual source location information, and more realistic audio signal reproduction in a multi-channel environment can be realized.

While the invention has been shown and described with reference to certain exemplary embodiments thereof, it will be understood by those skilled in the art that various changes in form and details may be made therein without departing from the spirit and scope of the invention as defined by the appended claims and their equivalents.

The present invention can be implemented by a non-transitory computer-readable recording medium storing a computer program for performing the method for encoding and/or decoding a multi-channel audio signal as presented above.

The invention claimed is:

1. An apparatus for encoding a multi-channel audio signal, the apparatus comprising:

a frame converter for converting the multi-channel audio signal into a framed audio signal;

means for downmixing the framed audio signal;

means for encoding the downmixed audio signal;

a source location information estimator for estimating source location information from the framed audio signal;

means for quantizing the estimated source location information; and means for multiplexing the encoded audio signal and the quantized source location information, to generate an encoded multi-channel audio signal.

2. The apparatus according to claim 1, wherein said downmixing means downmixes the framed audio signal as either one of monophonic or stereophonic signal.

3. The apparatus according to claim 1, wherein when the downmixed audio signal is the monophonic signal, the source location information estimator estimates an LHV (Left Half-plane Vector), an RHV (Right Half-plane Vector), an LSV (Left Subsequent Vector), an RSV (Right Subsequent Vector), and a GV (Global Vector).

4. The apparatus according to claim 1, wherein when the downmixed audio signal is the stereophonic signal, the source location information estimator estimates an LHV (Left Half-plane Vector), an RHV (Right Half-plane Vector), an LSV (Left Subsequent Vector), and an RSV (Right Subsequent Vector).

5. The apparatus according to claim 1, wherein said source location information estimator comprises:

a time-to-frequency converter for converting the framed audio signal into a spectrum;

a separator for separating per-band spectrums;

an energy vector detector for detecting per-channel energy vectors from the corresponding per-band spectrum; and a VSLI estimator for estimating virtual source location information (VSLI) using the detected per-channel energy vector detected by the energy vector detector.

6. The apparatus according to claim 5, wherein said time-to-frequency converter converts the framed audio signal into the spectrum using a plurality of FFTs (Fast Fourier Transforms).

7. The apparatus according to claim 5, wherein the separator separates the spectrum using an ERB (Equivalent Rectangular Bandwidth) filter bank.

8. The apparatus according to claim 5, wherein the detected per-channel energy vector includes a center channel energy vector (C), a front left channel energy vector (L), a left subsequent channel energy vector (LS), a front right channel energy vector (R), and a right subsequent channel energy vector (RS).

9. The apparatus according to claim 5, wherein the VSLI is represented as azimuth angle information based on a center channel, and the azimuth angle information includes an LHa (Left Half-plane vector angle), an RHa (Right Half-plane vector angle), an LSa (Left Subsequent vector angle), and an RSa (Right Subsequent vector angle).

10. The apparatus according to claim 9, wherein when the downmixed audio signal is the monophonic signal, the azimuth angle information further includes a Ga (Global vector angle).

11. An apparatus for decoding a multi-channel audio signal, the apparatus comprising:

means for receiving the multi-channel audio signal;

a signal distributor for separating the received multi-channel audio signal into an encoded downmixed audio signal and a quantized virtual source location vector signal;

means for decoding the encoded downmixed audio signal;

means for converting the decoded downmixed audio signal into a frequency axis signal;

a VSLI extractor for extracting per-band VSLI from the quantized virtual source location vector signal;

a channel gain calculator for calculating per-band channel gains using the extracted per-band VSLI;

means for synthesizing a multi-channel audio signal spectrum using the converted frequency axis signal and the calculated per-band channel gains; and means for generating a multi-channel audio signal from the synthesized multi-channel spectrum.

12. The apparatus according to claim 11, wherein the VSLI extractor extracts per-band virtual source azimuth angle information from the quantized virtual source location vector signal and produces VSLI from the extracted azimuth angle information.

13. The apparatus according to claim 12, wherein the virtual source azimuth angle information includes an LHa (Left Half-plane vector angle), an RHa (Right Half-plane vector angle), an LSa (Left Subsequent vector angle), and an RSa (Right Subsequent vector angle) for each band, and the produced VSLI vectors include an LHV (Left Half-plane Vector), an RHV (Right Half-plane Vector), an LSV (Left Subsequent Vector), and an RSV (Right Subsequent Vector).

14. The apparatus according to claim 13, wherein when the encoded downmixed audio signal is monophonic, and the virtual source azimuth angle information further includes a Ga (Global vector angle), and a GV (Global Vector) is produced from the Ga.

15. A method of encoding a multi-channel audio signal, comprising the steps of:

converting the multi-channel audio signal into a framed audio signal;

downmixing the framed audio signal;

encoding the downmixed audio signal;

estimating source location information from the framed audio signal;

quantizing the estimated source location information; and multiplexing the encoded downmixed audio signal and the quantized source location information, to generate an encoded multi-channel audio signal.

16. The method according to claim 15, wherein the framed audio signal is downmixed into either one of a monophonic signal and a stereophonic signal.

17. The method according to claim 15, wherein when the downmixed audio signal is the monophonic signal, the estimated source location information includes an LHV (Left Half-plane Vector), an RHV (Right Half-plane Vector), an LSV (Left Subsequent Vector), an RSV (Right Subsequent Vector), and a GV (Global Vector).

18. The method according to claim 15, wherein when the downmixed audio signal is the stereophonic signal, the estimated source location information includes an LHV (Left Half-plane Vector), an RHV (Right Half-plane Vector), an LSV (Left Subsequent Vector), and an RSV (Right Subsequent Vector).

19. The method according to claim 15, wherein the step of estimating the source location information comprises the steps of:

converting the framed audio signal into a spectrum;

separating the spectrum into per-band spectrums;

detecting per-channel energy vectors from the per-band spectrums; and estimating VSLI using the detected per-channel energy vectors.

20. The method according to claim 19, wherein the detected per-channel energy vectors include a center channel energy vector (C), a front left channel energy vector (L), a left subsequent channel energy vector (LS), a front right channel energy vector (R), and a right subsequent channel energy vector (RS).

21. The method according to claim 19, wherein the step of estimating the VSLI comprises the steps of:

estimating an LHV using the front left channel energy vector (L) and the left subsequent channel energy vector (LS);

estimating an RHV using the front right channel energy vector (R) and the right subsequent channel energy vector (RS);

estimating an LSV using the estimated LHV and the center channel energy vector (C); and estimating an RSV using the estimated RHV and the center channel energy vector (C).

22. The method according to claim 21, wherein when the downmixed audio signal is the monophonic signal, the estimated VLSI further includes a GV, and the estimating of the VSLI further comprises the step of estimating the GV using the estimated LSV and RSV.

23. The method according to claim 19, wherein when the downmixed audio signal is the stereophonic signal, the VSLI is expressed using an LHa, an RHa, an LSa, and an RSa based on a center channel.

24. The method according to claim 19, wherein when the downmixed audio signal is the monophonic signal, the VSLI is expressed using a Ga, an LHa, an RHa, an LSa, and an RSa.

25. A method of decoding a multi-channel audio signal, comprising the steps of:

receiving the multi-channel audio signal;

separating the received multi-channel audio signal into an encoded downmixed audio signal and a quantized virtual source location vector signal;

decoding the encoded downmixed audio signal;

converting the decoded downmixed audio signal into a frequency axis signal;

analyzing the quantized virtual source location vector signal and extracting per-band VSLI therefrom;

calculating per-band channel gains from the extracted per-band VSLI;

synthesizing a multi-channel audio signal spectrum using the converted frequency axis signal and the calculated per-band channel gains; and producing a multi-channel audio signal from the synthesized multi-channel spectrum.

26. The method according to claim 25, wherein said step of extracting the per-band VSLI extracts per-band virtual source azimuth angle information from the quantized virtual source location vector signal, and VSLI is produced from the extracted azimuth angle information.

27. The method according to claim 26, wherein the virtual source azimuth angle information includes an LHa (Left Half-plane vector angle), an RHa (Right Half-plane vector angle), an LSa (Left Subsequent vector angle), and an RSa (Right Subsequent vector angle), for each band, and the produced VSLI includes an LHV (Left Half-plane Vector), an RHV (Right Half-plane Vector), an LSV (Left Subsequent Vector), and an RSV (Right Subsequent Vector).

28. The method according to claim 27, wherein when the encoded downmixed audio signal is monophonic, the virtual source azimuth angle information further includes a Ga (Global vector angle), and a GV (Global Vector) is produced from the Ga.

29. The method according to claim 27, wherein said step of calculating the channel gain comprises, for each band, the steps of:

calculating magnitudes of the LSV and the RSV using a magnitude of the downmixed audio signal;

calculating a first gain of a center channel (C) and a magnitude of the LHV using the magnitude of the LSV and the LSa;

calculating a second gain of a center channel (C) and a magnitude of the RHV using the magnitude of the RSV and the RSa;

summing the first and second gains of the center channel (C) to produce a gain of the center channel (C);

calculating gains of a front left channel (L) and a left subsequent channel (LS) using the magnitude of the LHV and the LHa; and calculating gains of a front right channel (R) and a right subsequent channel (RS) using the magnitude of the RHV and the RHa.

30. A non-transitory computer-readable recording medium storing a computer program for performing the method for encoding a multi-channel audio signal according to any one of claim 15.

31. A non-transitory computer-readable recording medium storing a computer program for performing the method for decoding a multi-channel audio signal according to claim 25.

* * * * *